United States Patent
Niemeyer et al.

(10) Patent No.: US 8,795,419 B2
(45) Date of Patent: Aug. 5, 2014

(54) AIR DRYER, IN PARTICULAR IN A COMPRESSED AIR SYSTEM IN A COMMERCIAL VEHICLE

(75) Inventors: Stephan Niemeyer, Steinheim (DE); Bernd-Oliver Buchner, Frontenhausen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/615,009

(22) Filed: Sep. 13, 2012

(65) Prior Publication Data

US 2013/0239815 A1 Sep. 19, 2013

Related U.S. Application Data

(63) Continuation of application No. PCT/EP2011/053856, filed on Mar. 15, 2011.

(30) Foreign Application Priority Data

Mar. 18, 2010 (DE) .......................... 10 2010 011 956

(51) Int. Cl.
*B01D 53/02* (2006.01)

(52) U.S. Cl.
USPC .............................................. 96/134; 96/147

(58) Field of Classification Search
USPC ........... 96/134, 108, 135, 147, 131, 137, 139, 96/144, 149, 152; 55/DIG. 17, 392, 428, 55/486, 423, 485, 318; 210/209, 443, 450, 210/634, 767; 62/271; 95/117–118
See application file for complete search history.

(56) References Cited

U.S. PATENT DOCUMENTS

| 2003/0127402 A1* | 7/2003 | Deibel et al. ................... 210/798 |
| 2006/0123743 A1* | 6/2006 | Heer .............................. 55/309 |
| 2007/0175187 A1* | 8/2007 | Kopec et al. ................ 55/385.3 |
| 2008/0282657 A1* | 11/2008 | Reamsnyder et al. .......... 55/484 |
| 2009/0038327 A1* | 2/2009 | Amesoeder et al. ............. 62/271 |
| 2010/0269463 A1* | 10/2010 | Duffy et al. ..................... 55/483 |

FOREIGN PATENT DOCUMENTS

| DE | 4139680 A1 * | 6/1993 | ............. F01M 11/03 |
| DE | 102007046167 A1 * | 4/2009 | ............. B60T 17/00 |
| WO | WO2004/103509 A2 | 12/2004 | |
| WO | WO2009/043427 A1 | 4/2009 | |

OTHER PUBLICATIONS

Bee Jay Molding Inc., Custom Injection Molding Advantages, Bee Jay Molding Inc., 2006, p. 1.*
Dictionary.com, "insert" definition pdf.*
Micro-Control Adhesive Coating Technology, Frontier, Feb. 2001.*
Google search indidcating date of Micro-Control Adhesive Coating Technology as Feb. 2001.*
DE 4139680 English abstract.*

* cited by examiner

*Primary Examiner* — Duane Smith
*Assistant Examiner* — Cabrena Holecek
(74) *Attorney, Agent, or Firm* — James Hasselbeck

(57) ABSTRACT

An air dryer comprises an annular filter element (5) and a desiccant container (4) in a housing (2), the end faces of the filter element (5) being closed by end plate-type elements. The desiccant container forms at least one end plate-type element.

6 Claims, 3 Drawing Sheets

AIR DRYER, IN PARTICULAR IN A COMPRESSED AIR SYSTEM IN A COMMERCIAL VEHICLE

CROSS REFERENCE TO RELATED APPLICATIONS

This application is a bypass continuation of international patent application no. PCT/EP2011/053856 having a filing date of Mar. 15, 2011 and designating the United States of America. The entire disclosure of PCT/EP2011/053856 is hereby incorporated by reference. This application claims the benefit under 35 USC 119 of foreign application 10 2010 011 956.3 filed in Germany on Mar. 18, 2010 and which is hereby incorporated by reference in its entirety.

TECHNICAL FIELD

The invention relates to an air dryer, in particular in a compressed air system in a commercial vehicle.

BACKGROUND OF THE INVENTION

In DE 10 2007 034 435 A1, an air dryer with a cylindrical external housing is disclosed in which a filter element and a desiccant container are received. Such air dryers are usually employed in compressed air devices in commercial vehicles for dehumidifying the air. The filter element is of an annular configuration and encloses the desiccant container in which desiccant is received. The air that is introduced into the air dryer flows first radially through the filter element and subsequently axially through the desiccant in the desiccant container. The filter element is positioned in this connection with an end disk arranged at its end face axially on a shoulder of the desiccant container. A further end disk is located on the opposite end face of the filter element and is resting on an annular disk with a sealing lip for support on a housing component.

SUMMARY OF THE INVENTION

An object of the present invention to provide to provide an air dryer with simplified configuration.

The air dryer according to the invention is preferably used in motor vehicles, in particular in commercial vehicles, and supplies dried air for a compressed air device by means of which air-operated auxiliary devices are supplied with compressed air, for example, a braking device or a device for opening and closing doors of busses. In order to ensure that the compressed air does not exceed a maximum allowable level of humidity, the humidity is removed from the air by means of the air dryer.

The air dryer has a housing in which, on the one hand, a desiccant container is received and, on the other hand, a filter element that is of an annular configuration and, in the flow direction of the air to be dried, is positioned upstream of the desiccant container. The filter element has the function of a de-oiling element for the air wherein the filter element arranged upstream of the desiccant container is flowed through radially and the axial end faces of the filter element are closed. The flow direction is, for example, in radial direction from the interior to the exterior wherein basically also a flow in opposite direction, i.e., in radial direction from the exterior to the interior is conceivable.

In the air dryer according to the invention, at least one end disk at an end face on the filter element is formed by the desiccant container. The annular filter element is positioned in this connection with an end face axially on the exterior wall of the desiccant container so that an end disk embodied as an additional separate component is obsolete. Accordingly, the manufacture of the filter element that at least at the end face that is facing the desiccant container requires no additional end disk is simplified. In this connection, it is in particular provided that the end face of the filter element is resting pressure-tightly and flow-tightly on the desiccant container in order to prevent leakage flows at the end face. Expediently, the filter element is connected with the exterior wall of the desiccant container, in particular by gluing or welding, for example, friction welding or ultrasonic welding, wherein optionally also other material-fusing, frictional or form-fit connections are conceivable.

In case of gluing of the end face to the exterior wall of the desiccant container, expediently an adhesive is applied at least onto the end face of the filter element that is contacting the desiccant container. The adhesive or the adhesive material is preferably injected onto the end face of the filter element and cures in the state resting against the desiccant container so that a fixed adhesive connection that is at the same time flow-tight and pressure-tight can be realized.

According to a further expedient embodiment, on the exterior side of the desiccant container a circumferentially extending shoulder is formed that forms an axial support surface on which an end face of the filter element is resting. The annular filter element engages radially the desiccant container and is positioned axially with its end face on a radially widened and circumferentially extending shoulder of the desiccant container. In this connection, it may be expedient to provide on the shoulder a clamping wall on the desiccant container that extends in radial direction outwardly and has an extension in axial direction and that, together with the shoulder, forms a receptacle for the end face of the filter element. The radial wall surface where the inner side of the annular filter element is resting, the axial support surface on the shoulder, as well as the clamping wall positioned outwardly in radial direction form together a U-shape for receiving the filter element so that the filter element is secured also in radial direction by the shoulder and the clamping wall.

According to a further expedient embodiment, it is provided that an end disk on an end face of the filter element is a support for a sealing lip. Expediently, this end disk is embodied as a separate component that is connected with an end face of the filter element and at the same time supports the sealing lip so that the end disk therefore has a dual function. The end disk is located on the end face of the filter element that is positioned opposite the shoulder of the desiccant container.

The sealing lip is expediently injection-molded onto the end disk wherein, for improved connection between the sealing lip and the end disk it is advantageous when the end disk has a cutout and the sealing lip passes through the cutout. The introduction of the sealing lip into the cutout in the end disk is expediently realized also by way of injection molding. The sealing lip is received with form fit in the cutout so that at least in radial direction, optionally also in axial direction, a fixed connection between end disk and sealing lip is provided and the sealing lip is held safely on the end disk. The sealing lip is comprised in particular of an elastomer.

It can be expedient to connect the end disk that is embodied as a separate component by means of an adhesive with the end face of the filter element wherein optionally also the sealing lip projects with a sealing projection into the area of the adhesive.

Moreover, according to an advantageous embodiment, it is provided that on the end disk support legs are injection-molded on which a housing cover of the housing is supported. This embodiment can be combined advantageously with the cutout in the end disk and the injection-molded sealing lip, wherein basically also an embodiment independent therefrom is conceivable in which a cutout in the end disk for receiving a sealing lip is eliminated. The support legs that are injection-molded onto the end disk are supported preferably on a housing cover of the housing with which the, especially cup-shaped, housing is to be closed.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
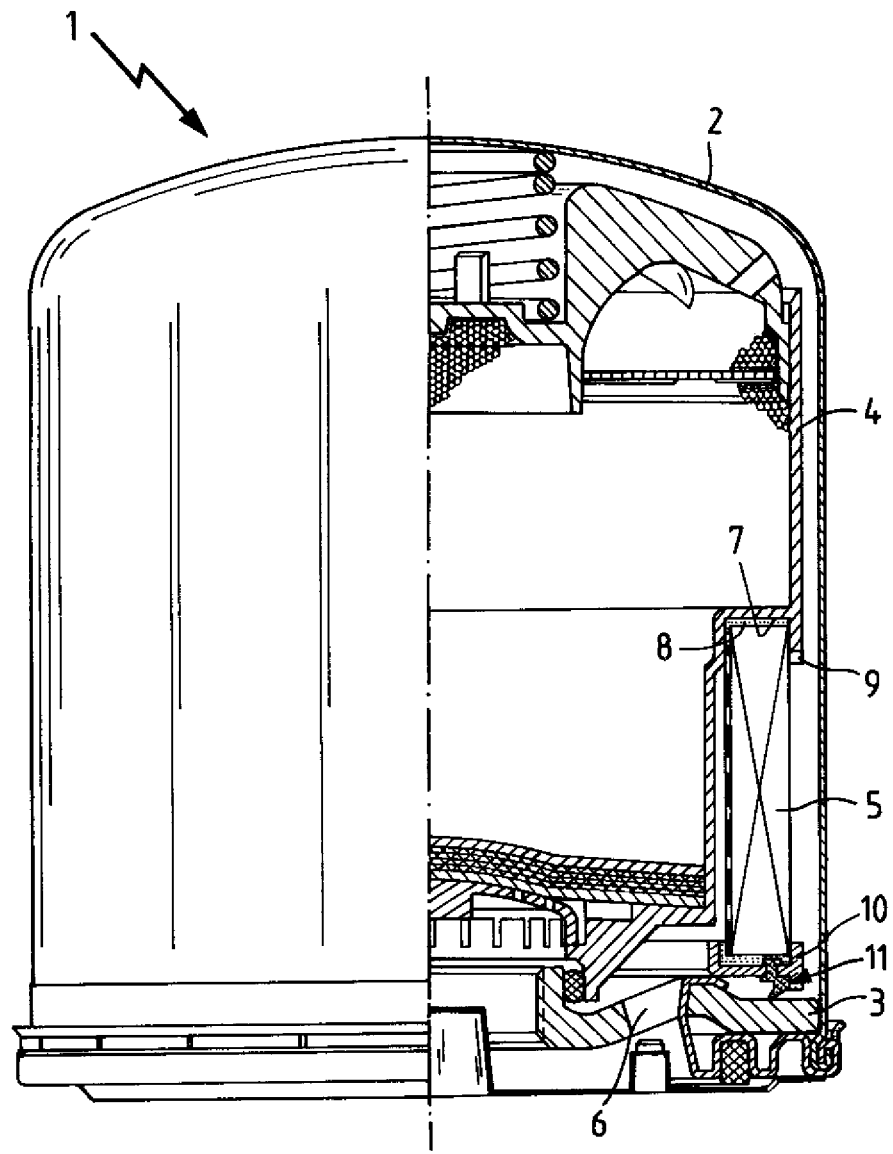
FIG. 1 depicts an air dryer for use in a compressed air device in a commercial vehicle, comprising a cup-shaped housing in which a desiccant container is received about which an annular filter element is positioned.

In the Figures, same components are identified with same reference characters. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to an air dryer. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The air dryer 1 according to FIG. 1 has a cylindrical or cup-shaped housing 2 that can be closed from below by a housing cover or threaded cover 3. In the housing 2, a desiccant container 4 with a desiccant is received which is used for drying the air that is passed through. The desiccant is, for example, silica gel.

The exterior wall of the desiccant container 4 is surrounded radially by an annular filter element 5 that serves as an air de-oiling element for cleaning the air passing through. The filter element 5 is positioned upstream of the desiccant container 4. The air that is supplied to the air dryer 1 and that is to be dehumidified is introduced through an inlet opening 6 in the housing cover 3 and flows first through the filter element 5 in radial direction from the interior to the exterior. Subsequently, the purified but still humid air is passed across the topside into the desiccant container 4 and flows through it in axial direction from top to bottom. The dehumidified air is subsequently discharged axially through the bottom side, i.e., the housing cover 3, out of the air dryer 1.

The filter element 5 extends axially approximately across half the axial length of the desiccant container 4. Approximately at the center of the desiccant container 4, the container has a shoulder 7 that is formed in that the desiccant container 4 in the upper area has a greater diameter than in the lower area in which the filter element 5 is located. The shoulder 7 is formed by the section of the desiccant container 4 that widens in radial direction wherein the axial end face on the shoulder 7 which is facing the housing cover 3 forms a support surface for the end face of the filter element 5.

Figure 2:
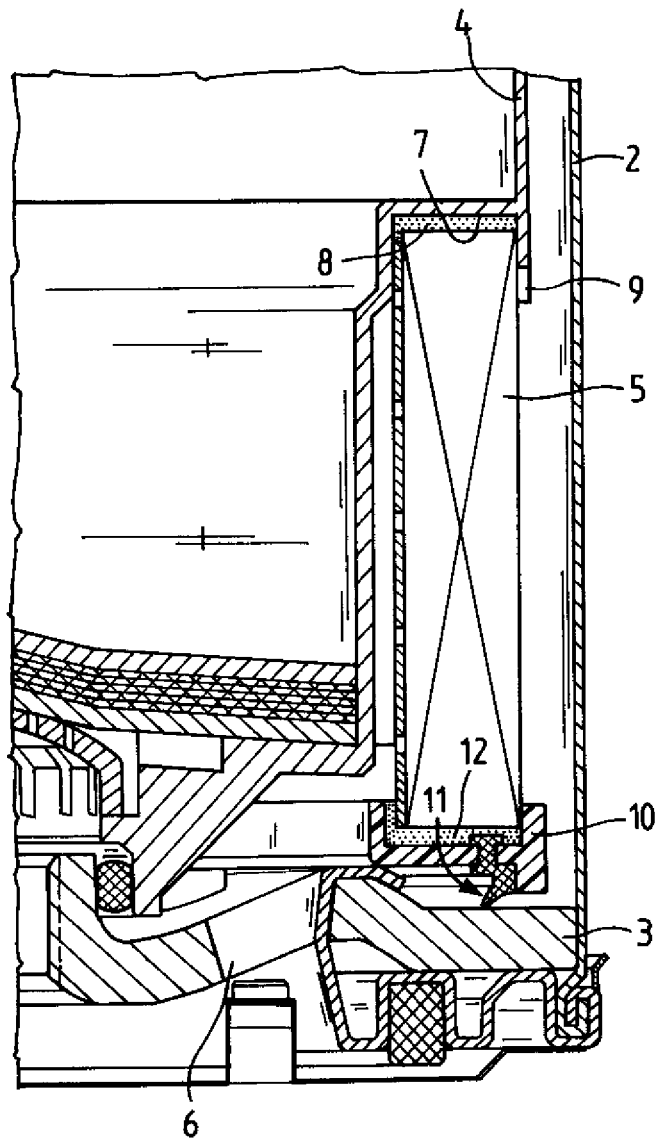
FIG. 2 depicts the air dry in the area of the filter element in a detail illustration.

As can be seen in FIG. 1 in connection with the detail illustration according to FIG. 2, the end face of the filter element 5 that is resting on the shoulder 7 is glued by means of an adhesive material or an adhesive 8 to the shoulder 7. As an alternative to an adhesive connection, for example, welding, for example, by friction welding or ultrasonic welding, is conceivable.

Monolithic with the wall of the desiccant container 4 a clamping wall 9 that is positioned in radial direction outwardly is provided at the level of the shoulder 7 wherein the clamping wall 9 forms an axial extension of the exterior wall in the area of the section of the desiccant container 4 that is widened in radial direction. The clamping wall 9 projects axially past the shoulder 7 so that a U-shaped receptacle for the end face of the filter element 5 is provided and U-shaped receptacle is defined by the inner wall of the clamping wall 9, the shoulder 7 as well as the exterior wall surface of the desiccant container in the area of the section reduced in radial direction.

Figure 3:
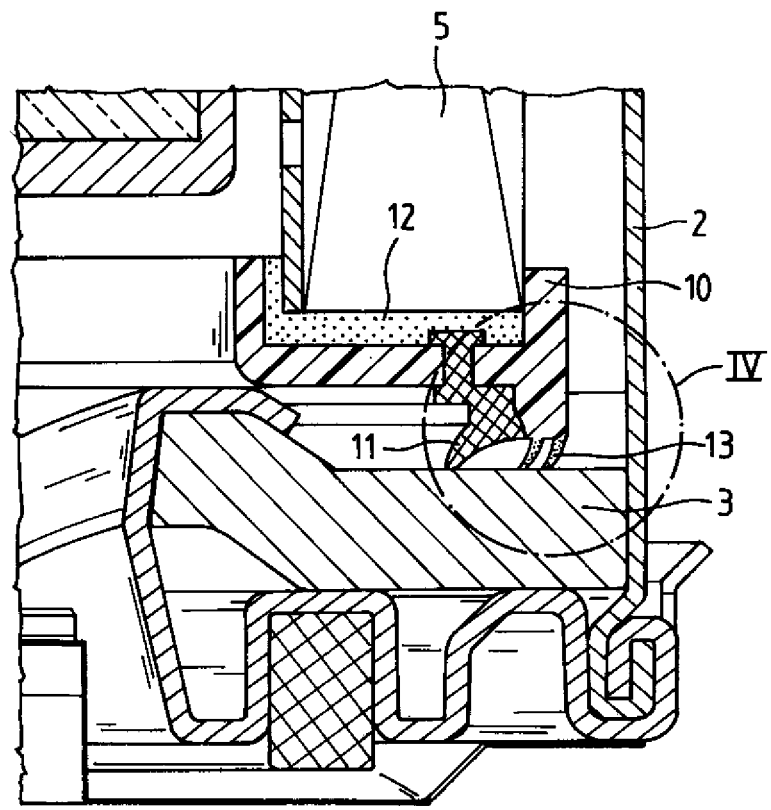
FIG. 3 depicts the filter element with an end disk at the end face, the end disk having a cutout with injection-molded sealing lip.

As can be seen in FIGS. 1 through 3, the lower end face of the filter element 5 that is opposite the shoulder 7 is framed by an end disk 10 that is embodied as a separate component. A cutout is introduced into the end disk 10 into which a sealing lip 11 is injection-molded. The main part of the sealing lip 11, which is preferably comprised of an elastomer, projects on the side that is facing away from the filter element 5 past the end face 10 wherein the free end face of the sealing lip 11 is contacting the housing cover 3. In this way, a flow-tight contact between the housing cover 3 and the circumferentially extending sealing lip 11 is formed.

The end face of the filter element 5 which is framed by the end disk 10 is provided with an adhesive 12 by means of which the end face is glued to the end disk 10. A leg of the sealing lip 11 that extends through the cutout in the end disk 10 projects expediently into the adhesive 12.

Figure 4:
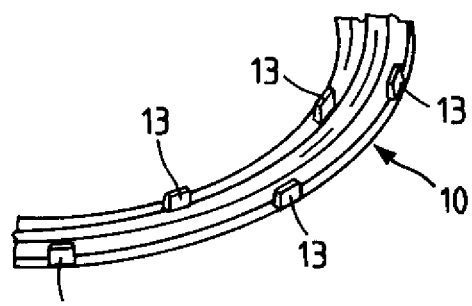
FIG. 4 depicts the end disk according to detail IV of FIG. 3 in a detail view.

As can be seen in FIG. 3 in connection with FIG. 4, the end disk 10 is supported by means of injection-molded support legs 13 on the housing cover 3. The support legs 13 are located in particular in the area of the end disk 10 that in radial direction is outwardly positioned. The sealing lip 11 is displaced in radial direction inwardly relative to the support legs 13.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. An air dryer for a compressed air device in a commercial vehicle, comprising:
   a cup-shaped housing (2) having an open axial end;
   a housing cover (3) secured to and closing over the open axial end of the housing (2);
   an annular filter element (5) received within said housing (2), said filter element having opposing end faces;
   wherein a first one of said opposing end faces of said filter element is without an end disk;
   a desiccant container (4) received within said housing (2);
   wherein said desiccant container includes a circumferentially extending radially widened shoulder (7) extending radially inwardly from an outer wall of said desiccant container, forming an axial support surface for said first end face of said filter element;
   wherein said first end face of the filter element (5) is arranged on, resting upon and adhesively secured onto said radially widened shoulder (7); wherein an adhesive material (8) is applied onto and adhesively secured onto said first end face of said filter element, an opposing side of said adhesive material is contacting and adhesively secured onto said radially widened shoulder (7) forming a flow-tight and pressure tight connection between said first end face of said filter element and said desiccant container, said adhesive and desiccant container closing off said first end face of said filter element;
   wherein a second one of said filter element (5) end faces is secured onto an end disk (10), the end disk (10) having
   an axial interior side on which the second one of the filter element end faces is arranged; and
   an axially opposing exterior side;
   wherein the end disk (10) includes a through hole extending through the end disk (10) from the interior side to the exterior side;
   a sealing support lip (11) arranged on said exterior side of said end disk (10) and secured onto said end disk (10), said a sealing support lip (11) extending through said end disk (10) from said axial exterior side to said axial interior side of said end disk through said through hole.

2. The air dryer according to claim 1, wherein
said adhesive material (8) is injection-molded onto said first end face of the filter element (5).

3. The air dryer according to claim 1, wherein
on the shoulder (7) a clamping wall (9) positioned in a radial direction outwardly is formed on the desiccant container (4) that, together with the shoulder (7), forms a receptacle for an end face of the filter element (5).

4. The air dryer according to claim 1, wherein
the sealing lip (11) is injection-molded onto the end disk (10).

5. The air dryer according to claim 1, wherein
support legs (13) are provided having a first end arranged on said end disk (10);
wherein said a second end of said support legs (13) contact on an interior side of said housing cover, supporting said end disk (10) on said housing cover (3).

6. The air dryer according to claim 1, wherein
the end disk (10) is embodied as a separate component and is connected with an end face of the filter element (5).

\* \* \* \* \*